Patented Oct. 31, 1933

1,932,589

UNITED STATES PATENT OFFICE 1,932,589

FREQUENCY TRANSLATING DEVICE

William Henry Towne Holden, Brooklyn, N. Y., assignor to American Telephone and Telegraph Company, a corporation of New York Application November 3, 1932. Serial No. 641,112

6 Claims. (Cl. 172—281)

This invention relates to electrical circuits, and more particularly to circuits adapted to produce an output of a frequency which is submultiple of the input frequency.

Devices of this sort have been proposed, which involved the use of mechanical moving parts, either as rotating machines or as vibrating contacts, or which involve the use of saturated iron cores. Such devices are not ordinarily self-starting and require careful adjustment in order to operate in a satisfactory manner. It is an object of this invention to provide means for generating subharmonic frequencies which involve no moving parts nor saturated iron cores, and which will not involve critical adjustments to secure satisfactory operation. Other objects and features of this invention will become clear from the following description thereof.

Figure 1:
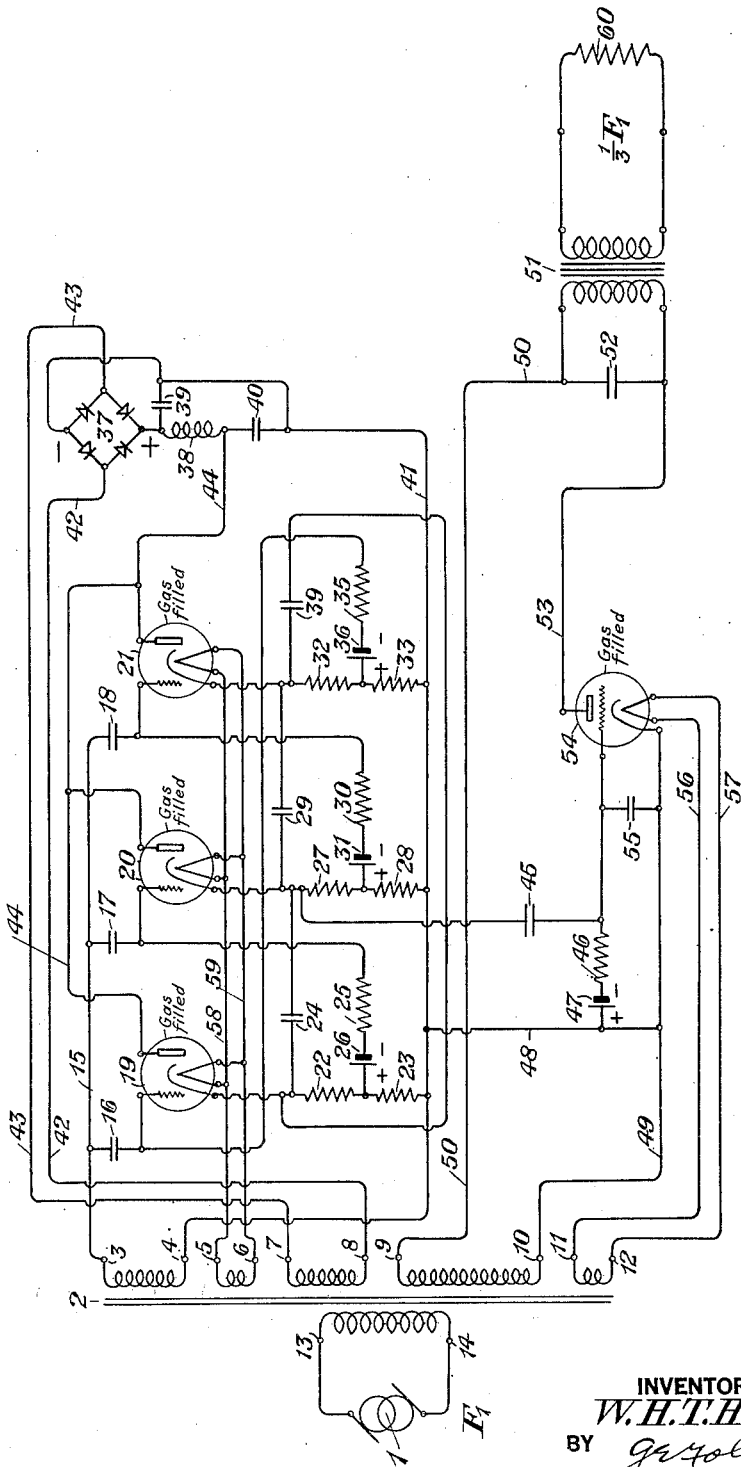
Figure 2:
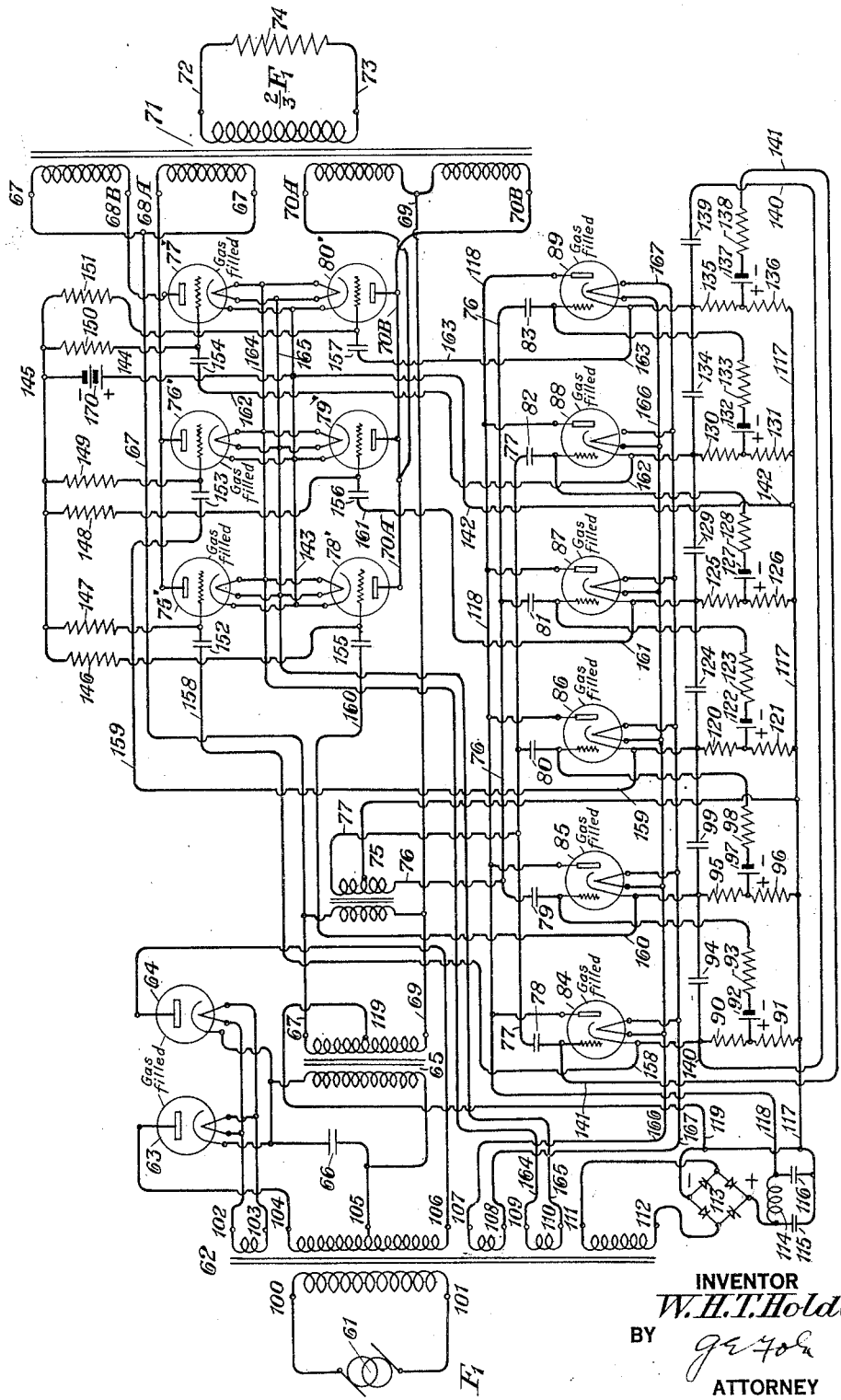

The invention may be more fully understood from the following description together with the accompanying drawings in the Figures 1 and 2 of which the invention is illustrated. Fig. 1 is a circuit diagram embodying a preferred form of the invention. Fig. 2 is a modification thereof. Similar reference characters have been used to denote like parts in both figures.

Referring to Fig. 1 which illustrates one form of the invention, a source 1 of alternating current of frequency $F_1$ is connected to the winding 13—14 of transformer 2. Windings 5—6 and 11—12 supply cathode heating energy to the cathodes of gas-filled discharge tubes 19, 20, 21 and of 54, respectively. These tubes may, for example, be filled with a gas such as neon. Winding 7—8 is connected by conductors 42 and 43 to rectifier 37, the direct current output of which supplies potential to the anode-cathode circuits of gas-filled tubes 19, 20 and 21, over conductors 41 and 44 and through the low-pass filter formed by inductance 38 and condensers 39 and 40.

The circuit between the cathode of tube 19 and conductor 41, which is connected to the negative pole of rectifier 37, contains resistances 22 and 23. Grid biasing battery 26, connected to the junction between resistances 22 and 23, applies a negative bias to the grid of tube 20 through the resistance 25. From the cathode of tube 19 condenser 24 connects to the cathode of tube 20, and condenser 29 to the cathode of tube 21. Condenser 39 is connected between the cathodes of tubes 21 and 19. Resistances 27 and 28 are connected in series between the cathode of tube 20 and conductor 41. From the junction between resistances 27 and 28 a circuit may be traced through grid biasing battery 31 and resistance 30 to the grid of tube 21. Similarly resistances 32 and 33 are connected in series between the cathode of tube 21 and conductor 41, while grid biasing battery 36, connected to the junction between resistances 32 and 33, supplies grid bias to the grid of tube 19 through resistance 35. Alternating voltage of frequency $F_1$ is applied between conductor 41 and the grids of tubes 19, 20 and 21 by winding 3—4 of transformer 2. Conductor 15 is connected to terminal 3 of this winding, and to the grids of the tubes 19, 20 and 21 through the blocking condensers 16, 17 and 18.

The batteries 26, 31 and 36 are of such value that when no current flows through the resistances to which these batteries are connected, the anode voltage from rectifier 37 is insufficient to cause an arc to strike even when the positive half cycles of the alternating voltage from the winding 3—4 swing these grids positive, provided that there is some load upon the rectifier. If, however, there is no arc in any of the tubes 19, 20 and 21, as at starting, the rectifier voltage output will rise to the point where some one of the tubes 19, 20 or 21 will strike an arc on a positive half cycle of the voltage from the winding 3—4 of transformer 2, lowering the rectifier voltage as a result of this load. Although the input is applied to all tubes, an arc will strike in but one at starting, due to slight differences in characteristics. Suppose that this arc strikes in tube 19, for example, although it will be clear upon considering the following explanation that it is actually immaterial in which tube the arc first strikes. Current will flow through the arc path of this tube, from the positive terminal of rectifier 37, through inductance 38, over conductor 44 to the anode of tube 19, through the arc to the cathode of tube 19 and through resistances 22 and 23 to conductor 41 and thence back to the negative terminal of rectifier 37. At the same time the potential of the cathode of tube 19, which prior to the striking of the arc was the same as that of conductor 41, rises suddenly due to the drop in resistances 22 and 23 to a value corresponding to that of the rectifier output, under load, less the drop in the arc itself. This positive impulse will be transmitted through condensers 24 and 29 to the cathodes of tubes 20 and 21 and will prevent any tendency for arcs to form therein during this positive half cycle of the voltage of frequency $F_1$ supplied by winding 3—4 of transformer 2. The flow of current through resistance 23 raises the potential of the point to which the positive terminal of battery 26 is connected, thereby reducing the negative bias on the grid of tube 20. Current will continue to flow in the arc path of tube 19 until on the next positive half cycle of frequency $F_1$ after the one upon which the arc struck in tube 19, an arc will strike in tube 20, due to positive impulse applied to its grid and to the reduction in grid bias due to the drop in resistance 23. When this arc strikes, current will flow from conductor 44 through the arc path of tube 20, resistances 27 and 28 to conductor 41. The positive surge through condensers 24 and 29, resulting from the sudden flow of current through resistances 27 and 28 will raise the potentials of the cathodes of tubes 19 and 21 with respect to conductor 41, as previously explained, but this will now extinguish the arc in tube 19, while preventing an arc from striking in tube 21, until the charge on condensers 24 and 29 has leaked off through the resistances 22 and 23 or 32 and 33, respectively. This time should be of the order of that for one half cycle of frequency $F_1$. The drop in resistance 28 reduces the negative grid bias on the grid of tube 21, so that upon the next positive half cycle of frequency $F_1$ an arc will strike therein, which will, as before, extinguish the arc in tube 20 and prevent arc formation in tube 19. On the next positive half cycle, tube 19 will strike an arc, as its negative grid bias has been lessened by the drop in resistance 33, and will extinguish the arc in tube 21 as hereinbefore explained. Thus it is apparent that tubes 19, 20 and 21, will fire one after the other cyclically on successive positive half cycles of the frequency $F_1$, and any given tube, say, tube 20, for example, will fire every third positive half cycle, as there are three of these pulse counting tubes.

It is obvious that if N tubes connected in a manner similar to tubes 19, 20 and 21 were provided, any one would fire every Nth positive half cycle of the input frequency $F_1$.

There is also provided a winding 9—10 on transformer 2, terminal 10 of which is connected to conductor 49 and thus to the cathode of gas-filled tube 54, and also over conductor 48 to conductor 41. Terminal 9 of this winding connects over conductor 50 to the primary winding of transformer 51, and thence over conductor 53 to the anode of tube 54. The polarity of terminal 9 of winding 9—10 will be the same at that of terminal 3 of winding 3—4. The grid of tube 54 is biased negatively by battery 47, through resistance 46, so that ordinarily no arc will form therein. However, the cathode of tube 20 is connected to the grid of tube 54 through condenser 45, and the positive surge transmitted from tube 20 when an arc strikes therein will cause an arc to strike in tube 54, lasting the remainder of this positive half cycle of the frequency $F_1$. As there is no direct current source in the anode circuit of tube 54, the arc therein will be extinguished at the next negative half cycle of frequency $F_1$. By-pass condenser 55, which should be small in capacity compared with condenser 45, prevents accidental firing of the arc in tube 54 at improper times due to pick-up of transients by the grid wiring of tube 54 and its associated circuits.

Thus it will be seen that, as tube 20 passes current every third positive half cycle of frequency $F_1$, tube 54 will pass at least a half, and for optimum adjustment of the circuit, the major portion of every third positive half cycle of frequency $F_1$ into and through the primary of transformer 51. This primary is shunted by a capacity 52 so as to be resonant, for the case shown, to one third the frequency $F_1$, and the impulses every third positive half cycle through the tube 54 will sustain oscillations of one third the frequency $F_1$ therein. The secondary of transformer 51 will then deliver current of one third the frequency $F_1$ to the load 60.

The tube 54 will preferably be of a high current capacity type, while the tubes 19, 20 and 21 may be of very limited capacity, the only requirement being that tube 20 should be capable of applying a sufficiently large impulse to start the arc in tube 54.

An arrangement of this sort may, for example, be used to obtain 20 cycles from a 60-cycle supply. By inserting a frequency multiplier or harmonic generator and selective circuits between the source 1 of frequency $F_1$ and the transformer 2, and by using a suitable number of pulse-counting tubes, other than integral ratios can be obtained. For example, let a five to one multiplication of frequency be made between source 1 and the transformer 2, and let there be 12 pulse-counting tubes. Then if $F_1$ is 60 cycles, $5F_1$ will be 300 cycles, and one of the 12 pulse-counting tubes will pass current every 25th of a second. 25-cycle output will thus be obtained. It is also apparent that to obtain any considerable amount of energy in the lowered output frequency, the energy transmitted through tube 54 while it passes current will of necessity be large. It is, therefore, preferable to employ another circuit similar in principle to that of Fig. 1, but which will enable current to flow into the work circuit for a greater period. The situation is quite analogous to the case of a half wave rectifier as compared to a full wave or to a polyphase rectifier.

Fig. 2 illustrates a circuit which obviates the disadvantages above referred to, which is arranged to produce 40-cycle current from a 60-cycle supply, or, in general, to produce an output frequency two-thirds that of the input. By applying the principles here disclosed it would, of course, be possible to carry out other similar conversions, the only requirement being that the frequency ratio shall be expressible as the ratio of two integers.

Power is supplied from source 61 of frequency $F_1$ to transformer 62, being applied to the winding 100—101. Winding 102—103 supplies cathode heating current to the cathode heaters of gas-filled two-element tubes 63 and 64. Winding 104—106, provided with center tap 105 supplies current to the frequency doubling circuit composed of rectifiers 63 and 64 and transformer 65. Across the secondary of this transformer, as is well known in the art, there will appear a frequency $2F_1$. Winding 107—108 of transformer 62 supplies cathode heating current over conductors 166 and 167 to the cathodes of the pulse-counting gas-filled tubes 84, 85, 86, 87, 88 and 89. These tubes, together with their cathode resistances 90, 91, 95, 96, 120, 121, 125, 126, 130, 131, 135 and 136, cathode impulse condensers 94, 99, 124, 129, 134 and 139, grid biasing batteries 92, 97, 122, 127, 132 and 137 and grid leak resistances 93, 98, 123, 128, 133 and 138, constitute a six-tube pulse counting circuit similar to the one explained in detail in connection with Fig. 1. However, the grids of tubes 84, 86 and 88 are connected through grid condensers 78, 80 and 82, respectively, to conductor 77 which goes to one terminal of the secondary of transformer 75, the primary of which is bridged across conductors 67 and 69 which are connected to the secondary of transformers 65, and, therefore, carry the frequency $2F_1$. The grids of tubes 85, 87 and 89 are connected through the grid blocking condensers 79, 81 and 83, respectively, to conductor 76 which is connected to the other terminal of the secondary winding of transformer 75, while a center tap from this secondary winding is connected to conductor 117, the common cathode return lead of the six-pulse counting tubes. Therefore, the pulse-counting tubes will fire in succession as in the case previously explained in connection with Fig. 1, but on every half cycle. As there are six tubes in all, it will require three cycles of the input frequency to transformer 75 to complete the cycle of operation of the pulse-counting tubes.

Winding 109—110 of transformer 62 supplies cathode heating energy to the high capacity gas-filled tubes 75', 76', 77', 78', 79' and 80'.

Winding 111—112 of transformer 62 supplies energy to the rectifier 113 and the associated filter composed of inductance 114 and condensers 115 and 116, whereby direct current is supplied over conductors 117 and 118 to the anode-cathode circuits of the pulse-counting tubes 84, 85, 86, 87, 88 and 89. Conductor 117 is the negative pole of this circuit.

From the ends of the secondary winding of transformer 65, conductors 67 and 69 lead to the four primary windings of transformer 71, each of these conductors connecting to terminals of opposite polarity of two such primary windings. From the one of two primaries to which conductor 67 is connected, conductor 68A is connected to the anodes of tubes 75' and 76', while from the other winding connected to conductor 67 at one end, conductor 68B leads to the anode of gas-filled tube 77'. From one of the primary windings connected to conductor 69, and of the same polarity as that to which conductor 68A is connected, conductor 70A leads to the anode of tube 78'. From the terminal of the other winding to which conductor 69 is connected, and of the same polarity as the terminal connected to conductor 68B, conductor 70B leads to the anodes of tubes 79' and 80'.

The grids of the tubes 75', 76', 77', 78', 79' and 80' are connected through their respective grid leak resistances 147, 149, 150, 146, 148 and 151 to the negative pole of grid biasing battery 170 over conductor 145, the positive pole of which is connected to the cathodes of tubes 75', 76', 77', 78', 79' and 80' by conductors 143 and 144. From conductor 143, connected to the cathodes of tubes 75', 76', 77', 78', 79' and 80', there is a path over conductor 142 to conductor 117, the negative side of the pulse-counting tubes anode-cathode circuit, and from conductor 117 over conductor 119 to the center tap of the primary winding of transformer 65. Grid condenser 152 is connected between the grid of tube 75' and the cathode of tube 84 over conductor 158. Therefore, whenever tube 84 fires, an impulse will be transmitted to the grid of tube 75' and this tube will also fire, passing current thereafter until the end of that half cycle of the frequency 2F₂ supplied from the transformer 65. Similarly the grid of tube 78' is connected through condenser 155 and over conductor 160 to the cathode of tube 85, and on the next half cycle after that on which 84 and 75' fired, tube 85 will fire and cause 78' to also operate, and similarly for tubes 76' and 86, the grid of 76' being connected to the cathode of 86 over conductor 159 and through condenser 153. It will be noted that the half waves of current of frequency 2F₁ passed through the primary windings of transformer 71 have thus far all been in the same direction. However, when the next pulse-counting tube 87 fires, an impulse will be transmitted from its cathode over conductor 161 to and through condenser 156 to the grid of tube 79'. This tube will take current from transformer 65 over conductor 69, through a primary of transformer 71 to conductor 70B, the arc path of tube 79', to the cathode thereof and back to the center tap of the secondary of transformer 65 over conductors 143, 142, 117 and 119. But this current will flow through the winding on transformer 71 in such a direction as to reverse the fluxes set up by the currents flowing during the preceding three half cycles of the frequency 2F₁ appearing on the secondary of transformer 65. Similarly tube 88 will send an impulse from its cathode over conductor 162 and through condenser 154 to tube 77', and the current flow in the arc circuit of this tube on the next half cycle after that in which tubes 87 and 79' operated will continue to sustain flux in the core of transformer 71, in the same direction as that produced by the arc current of tube 79'. And in the same way tube 89, on the next succeeding half cycle of frequency 2F₁, will transmit an impulse from its cathode over conductor 163 to condenser 157 and thence to the grid of tube 80', which will again produce by its arc current a flux in the same direction of the core of transformer 71. But on the next half cycle tubes 84 and 75' will operate and the flux in the core of transformer 71 will again be reversed.

Thus it appears that, since the tubes 84, 85, 86, 87, 88 and 89 operate in succession on each half cycle of the frequency 2F₁, and the connections to the tubes 75', 76', 77', 78', 79' and 80' being as shown, so that these tubes operate under the control of the pulse-counting tubes, the flux in the core of transformer 71 due to the arc currents of tubes 75', 76', 77', 78', 79' and 80' will reverse every third half cycle of the frequency 2F₁ supplied from transformer 65. There will thus be induced in the secondary or output winding of transformer 71 a frequency ⅔F₁, which will be supplied over conductors 72 and 73 to the load or work circuit 74.

While this invention has been described with reference to two specific embodiments thereof, it is not limited thereto, but is intended to include any and all organizations falling within the scope and spirit of the appended claims. Substitution of cold cathode for thermionic tubes, or of other types of rectifier, or the use of different numbers of tubes in the counting circuits, and in the controlled circuits, to secure other ratios of frequency transformation, or varying efficiencies of utilization of the power carrying capacities of the commutating tubes controlled from the pulse-counting tubes are clearly possible within the scope of this invention.

What is claimed is:

1. A frequency translating device comprising a source of alternating current of a certain frequency, a series of gas-filled discharge tubes and circuits therefor, means for applying alternating voltages therefrom said source simultaneously to the grids of all of said tubes, means for so adjusting the constants of the circuits for said tubes that the discharging of any tube upon the application of a positive voltage to the grid thereof during a positive half cycle of said alternating current will extinguish the next preceding tube of the series and will prevent the discharging of the next succeeding tube of the series during the same positive half cycle of said alternating current and will prepare said next succeeding tube so that it will discharge upon the application to the grid thereof of a positive voltage during the next positive half cycle of said alternating current, a circuit connected to said source of current, and means controlled by one of said series of tubes when in a discharging condition for closing said circuit.

2. A frequency translating device comprising a source of alternating current of a certain frequency, a series of gas-filled discharge tubes having their input circuits connected in parallel with said source, the circuits for the tubes of said series having their constants so adjusted that said tubes will be operated and released sequentially in a cyclic manner by successive positive half cycles of said alternating current, a work circuit connected to said source of current, and means for controlling the transmission of current from said source over said work circuit by the discharging of one of the tubes of said series.

3. A frequency translating device comprising a source of alternating current of a certain frequency, a series of gas-filled discharge tubes having their input circuits connected in parallel with said source, the circuits for the tubes of said series having their constants so adjusted that said tubes will be operated and released sequentially in a cyclic manner by successive positive half cycles of said alternating current, a work circuit connected to said source of current, a gas-filled discharge tube having its cathode and anode electrodes connected in series in said work circuit, and means controlled by the discharging of one of the tubes of said series for causing said last mentioned tube to discharge.

4. A frequency translating device comprising a source of alternating current of a certain frequency, a series of gas-filled discharge tubes, means for applying alternating voltages from said source simultaneously to the grids of all of said tubes, a circuit connected to said source and including a rectifier, means connected to said rectifier for supplying voltages to the anodes of all of said tubes, condensers interconnecting the cathode of each one of said tubes with the cathodes of preceding and succeeding tubes whereby the discharging of one tube will change the potential of the cathode of the preceding tube to cause it to be extinguished and will change the potential on the cathode of the succeeding tube to prevent it from discharging during the same positive half cycle of said current which caused the tube preceding it to discharge, means for applying a negative biasing potential to the grids of said tubes, means controlled by the discharging of any tube for reducing the biasing potential applied to the succeeding tube, a circuit connected to said source of current, and means controlled by one of said series of tubes when in a discharging condition for closing said circuit.

5. A frequency translating device comprising a source of alternating current of a certain frequency, means for translating the current from said source to current of a multiple of the original frequency, a series of gas-filled discharge tubes controlled by the voltages of said multiple frequency current and arranged so that they will be operated and released sequentially in a cyclic manner on successive half cycles of said current, a second series of gas-filled discharge tubes corresponding to those of said first series and each adapted to be operated and released by the operation and release of its corresponding tube in said first series, and a transformer having a plurality of primary windings connected to the cathode-anode circuits of the tubes of said second series, said primary windings being so related to said tubes of said second series that the operation of a certain group of tubes in said second series will maintain the flux in said transformer in one direction and the operation of another group of tubes in said second series will maintain the flux in said transformer in another direction.

6. A frequency translating device comprising a source of alternating current of a certain frequency, means for translating the current from said source to current of a multiple of the original frequency, a series of gas-filled discharge tubes controlled by the voltages of said multiple frequency current and arranged so that they will be operated and released sequentially in a cyclic manner on successive half cycles of said current, a second series of gas-filled discharge tubes corresponding to those of said first series and each adapted to be operated and released by the operation and release of its corresponding tube in said first series, and a transformer having a plurality of primary windings connected to the cathode-anode circuits of the tubes of said second series, certain of said primary windings connected to a first group of said second series tubes to be operated being so poled that the flux in said transformer will be maintained in one direction when said group of tubes is operated, the other of said transformer windings connected to the next group of said second series tubes to be operated being so poled that the direction of the flux in said transformer will be reversed and maintained in the opposite direction when said last mentioned group of tubes is operated.

WILLIAM H. T. HOLDEN.